United States Patent [19]

Yamamoto et al.

[11] Patent Number: 5,003,919
[45] Date of Patent: Apr. 2, 1991

[54] APPARATUS FOR STABILIZATION TREATMENT OF FERROMAGNETIC METAL POWDER

[75] Inventors: Tetsushi Yamamoto; Masaru Niwano; Etsuo Nakagawa, all of Minamata, Japan

[73] Assignee: Chisso Corporation, Japan

[21] Appl. No.: 364,489

[22] Filed: Jun. 9, 1989

Related U.S. Application Data

[63] Continuation of Ser. No. 154,324, Feb. 10, 1988, abandoned.

[30] Foreign Application Priority Data

Feb. 12, 1987 [JP] Japan .................. 62-30558

[51] Int. Cl.$^5$ ............................. B05C 3/08
[52] U.S. Cl. ................. 118/716; 118/303; 427/242
[58] Field of Search ............ 118/19, 20, 58, 303, 118/716; 427/242

[56] References Cited

U.S. PATENT DOCUMENTS

| | | | |
|---|---|---|---|
| 2,805,639 | 9/1957 | Martin | 118/20 |
| 2,944,512 | 7/1960 | Wilson | 118/303 |
| 3,141,792 | 7/1964 | Lachman et al. | 118/303 |
| 3,187,715 | 6/1965 | Wellard | 118/716 |
| 3,220,875 | 11/1965 | Queneau | 118/716 |
| 3,381,659 | 5/1968 | Rieckmann et al. | 118/17 |
| 3,874,092 | 4/1975 | Huttlin | 118/20 X |
| 3,903,333 | 9/1975 | Shirley, Jr. et al. | 118/19 X |
| 4,133,290 | 1/1979 | Melliger | 118/303 |
| 4,168,674 | 9/1979 | Futter | 118/19 |
| 4,420,330 | 12/1983 | Jakusch et al. | 75/0.5 AA |
| 4,542,041 | 9/1985 | McClellan et al. | 118/19 |
| 4,644,665 | 2/1987 | Naunapper | 118/303 |

FOREIGN PATENT DOCUMENTS

55-164001 12/1980 Japan .
57-19301 2/1982 Japan .

Primary Examiner—Shrive Beck
Attorney, Agent, or Firm—Leydig, Voit & Mayer

[57] ABSTRACT

An apparatus for stabilizing treatment of ferromagnetic metal powder which apparatus makes it possible to form a surface-oxidized film on the powder which is as uniform and dense as possible and to afford ferromagnetic metal powder having a good quality, and which apparatus is characterized by comprising a horizontal, cylindrical, rotating type body of reactor; a feeding port for the ferromagnetic metal powder into the body; a withdrawing port for the ferromagnetic metal powder from the body; a blowing passageway for an oxidizing gas into the body; and a withdrawing passageway for the oxidizing gas from the body.

4 Claims, 3 Drawing Sheets

APPARATUS FOR STABILIZATION TREATMENT OF FERROMAGNETIC METAL POWDER

This application is a continuation of application Ser. No. 07/154,324, filed Feb. 10, 1988, now abandoned.

BACKGROUND OF THE INVENTION

1. Field of the Invention

This invention relates to an apparatus for stabilization treatment of ferromagnetic metal powder, and more particularly it relates to an apparatus for stabilization treatment of ferromagnetic metal powder particularly composed mainly of iron.

2. Description of the Related Art

The recent development of magnetic recording is noteworthy and advances in magnetic powder used therefor has also contributed, to the above development. Further, in order to achieve high density magnetic recording, development of ferromagnetic metal powder having a high coersive force and high saturation magnetization has been advanced.

However, since this ferromagnetic metal powder has a very high chemical activity due to its fine particles, the powder, if subjected to no treatment, is at once oxidized upon its exposure to air to lose its specific feature as its intrinsic magnetic material. In addition to such problem, heat generation and ignition occur due to its sudden oxidation to raise a problem of its handling safety. Still another problem is raised with respect to corrosion resistance which is most important among practical specific features of magnetic tape (hereinafter abbreviated merely to "tape").

Thus, in order to assure the quality and handling safety of ferromagnetic metal powder and the corrosion resistance of tape, adhesion of organic substances onto the surface of ferromagnetic metal powder or the surface oxidation treatment of ferromagnetic metal powder have been carried out.

However, as to the surface treatment with organic substances, a certain effect upon the stability of the magnetic powder itself is observed, but at the time of coating of the resulting powder, the number of choices of surfactant, solvent, etc. used for dispersing the organic substances is limited, thereby making difficult dispersion of coating more difficult; hence a high quality tape not only could not have been obtained, but also the treatment has been uttely ineffective to provide corrosion resistance to a tape.

As compared with the above-mentioned process, the surface oxidation treatment process i.e. the oxidized coating-forming process using diluted oxygen as an oxidizing gas has currently been most broadly employed and is an effective process. As an apparatus for practicing the process, reactors of a stirring vessel type (Japanese patent application laid-open No. Sho 55-164001/1980), a fluidizing vessel type (U.S. Pat. No. 4,420,330), and a fixed vessel type (Japanese patent application laid-open No. Sho 57-19301/1982) have been known, but a problem has been raised with respect to the apparatus used for forming a uniform and dense oxidized coating to thereby produce powder having a good quality.

The reaction which proceeds by means of the reactor of stirring vessel type is directed to a process of dispersing ferromagnetic metal powder in an organic solvent with stirring and blowing an oxidizing gas into the resulting dispersion to thereby form an oxidized film on the ferromagnetic metal powder, but in order to uniformly disperse the ferromagnetic metal powder in the organic solvent, it is inevitably necessary to grind powder granules into primary particles or secondary particles. However, the surface energy of ferromagnetic metal powder is so large that when the powder is ground, an agglomerate occurs; hence the surface oxidation not only becomes uneven, but also the agglomerate does not disintegrate to smaller particle so that it has a bad influence upon the physical properties of tape. Further, since it is necessary to carry out agitation inside the reaction vessel, a stirrer is provided therein; thus this agitation causes collision of particles with one another, resulting in pulverization and further agglomeration to thereby deteriorate the physical properties.

The reactor of the fluidizing vessel type is directed to an apparatus wherein ferromagnetic metal powder is fluidized in a gas to form an oxidized film, but it is difficult to establish fluidizing conditions and it is necessary to carry out good fluidization for uniform coating; thus pulverization and agglomeration due to collision of particles with one another occur so that a non-uniform oxidized film is not only formed, but also the physical properties of ferromagnetic metal powder are deteriorated.

As to the reactor of the fixed vessel type, since ferromagnetic metal powder is not moved, pulverization due to collision of particles with one another does not occur, but non-uniform oxidation due to uneven flow of gas occurs and in an extreme case, reaction abruptly proceeds due to local oxidation heat-generation; thus there is a fear that the operation itself is impossible.

As described above, conventional apparatus has been insufficient as an apparatus for producing ferromagnetic metal powder having a good quality and a stabilized surface.

SUMMARY OF THE INVENTION

The object of the present invention is to provide an industrial apparatus for stabilizing ferromagnetic metal powder according to the surface oxidization treatment process, which apparatus makes it possible to form a surface-oxidized film which is as uniform and dense as possible and to afford ferromagnetic metal powder having a good quality.

The present invention resides in an apparatus for stabilizing treatment of ferromagnetic metal powder, which apparatus comprises a horizontal, cylindrical, rotating type reactor body;

a port for feeding said ferromagnetic metal powder into said body of reactor;

a port for withdrawing said ferromagnetic metal powder from said reactor body, which port may be used in common to said feeding port;

a passageway for blowing an oxidizing gas into said body of reactor; and a passageway for withdrawing said oxidizing gas from said body of reactor.

DETAILED DESCRIPTION OF PREFERRED EMBODIMENTS

Figure 1:
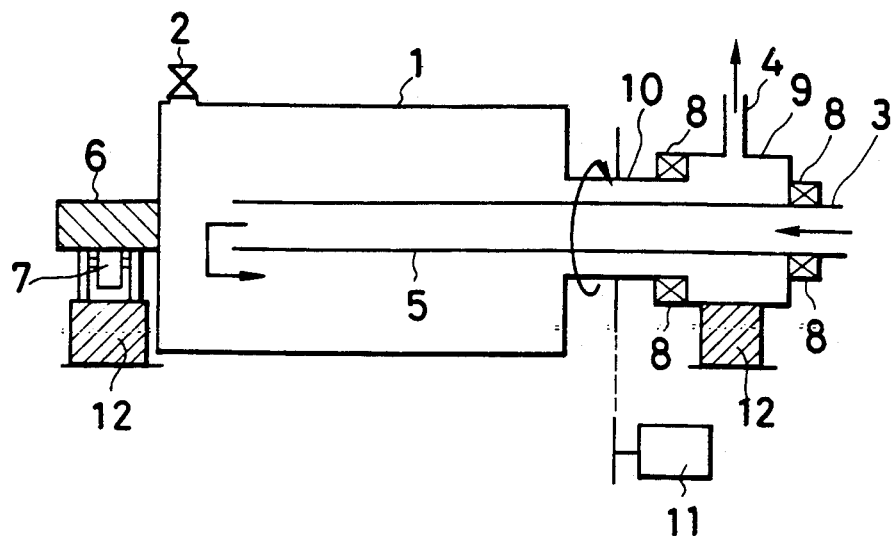
FIGS. 1, 2, 4 and 6 each show a cross-sectional schematic view illustrating an embodiment of the apparatus of the present invention.
Figure 2:
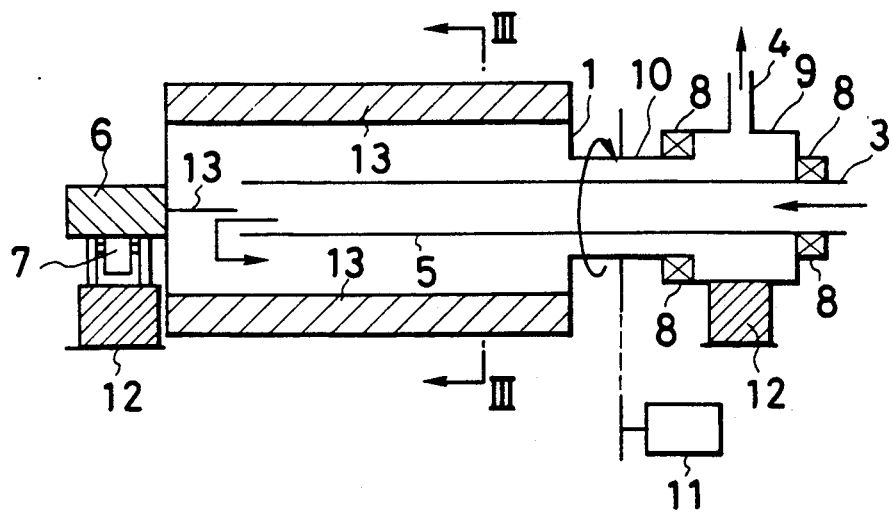
Figure 3:
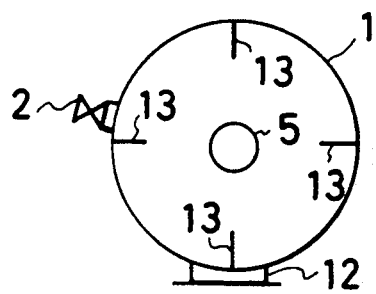
FIG. 3 shows a cross-sectional schematic view along the line III—III of FIG. 2.
Figure 4:
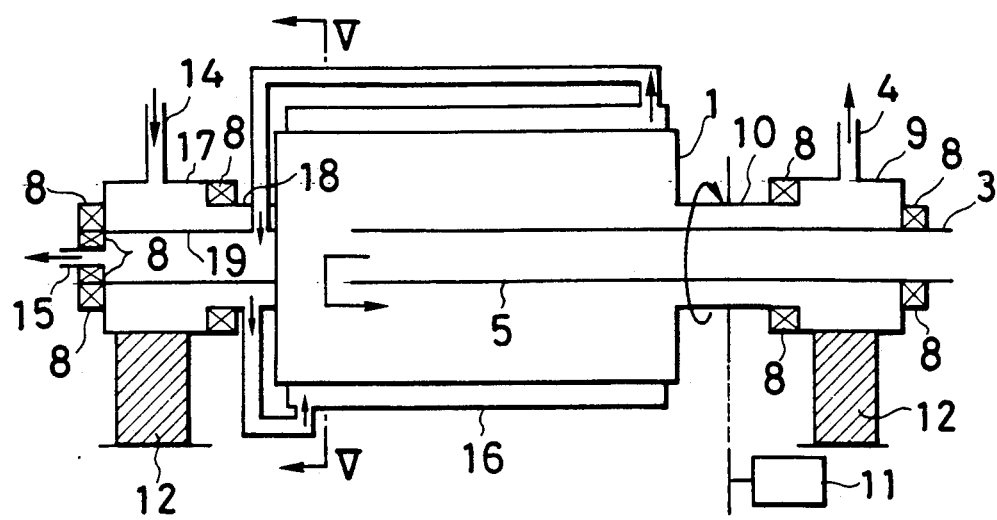
Figure 5:
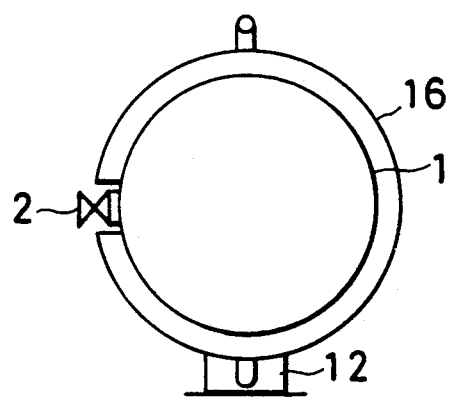
FIG. 5 shows a cross-sectional schematic view along the line V—V of FIG. 4.

In the accompanying drawings, numeral 1 shows the body of a reactor; 2, a feeding port for raw material (ferromagnetic metal powder) in common with a withdrawing port for ferromagnetic matal powder after stabilization treatment; 3,4, inlet and exit or outlet for oxidizing gas (either of which may be inlet or outlet; 3, inlet and 4, exit, in FIGS. 1, 2, 4 and 6); and 5, a pipe located at the central part of the body through which an oxidizing gas passes. The pipe 5 is supported by a pedestal (not shown) on the body of the reactor 1. The numeral 6 shows a shaft supporting the body; 7, a supporting roller; 8, a ground packing and a bearing. A gas or a liquid is sealed by the ground packing and the body of the reactor or the pipe located at the central part of the body through which an oxidizing gas gasses is supported by the bearing. Numeral 9 shows a box supporting the body of the reactor and 10, a gas duct. The inlet or exit 3 for the oxidizing gas and the pipe 5 located at the central part of the body through which the oxidizing gas passes constitute a passageway for blowing or withdrawing the oxidizing gas. The exit or inlet 4 for the oxidizing gas, the box 9 supporting the body of the reactor, the gas duct 10 and ground packings and bearings 8 between the box supporting the body of the reactor 9, the gas duct 10 and the pipe 5 at the central part of the body through which an oxidizing gas passes, constitute the withdrawing passageway or the blowing-in passageway for the oxidizing gas. Numeral 11 shows a driving motor for rotating the body of the reactor; 12, a support for the reaction apparatus; 13, a scraping-up plate; and 14, 15, inlet and outlet or exit for heating medium or cooling medium (either of which may be inlet or exit; and in FIGS. 4 and 6, numeral 14 shows inlet and 15, exit); 16, a jacket; 17, a box supporting the body of the reactor; 18, an outer side duct for heating (or cooling), i.e., a heat transfer medium; 19, an inner side duct for heating (or cooling), i.e., a heat transfer medium; and 20, granules of ferromagnetic metal powder. Arrow marks indicate the flow direction of the oxidizing gas, the flow direction of heating or cooling medium and the rotating direction of the body of the reactor.

A raw material composed mainly of iron and also containing at least one component of metal elements other than iron such as Ni, Si, Al, Mn, Cu, Cr, Ti, Mg, Co, Zn, Ba, Sn, etc. and compounds of these metal elements, the content of the metal element being in the range of 0 to 50% by weight based on the weight of iron, is molded into granules having a minimum diameter of 0.25 to 10 mm, and it is preferred to use such granules. If the proportion of the metal elements other than iron and compounds thereof exceeds 50% by weight based on the weight of iron, there is a fear that the ferromagnetic characteristics are lost. Further, if the minimum diameter of granules of ferromagnetic metal powder is less than 0.25 mm, the granules are scattered by an oxidizing gas to the outside of the body of the reactor 1. If the minimum diameter of the granules exceeds 10 mm, there is a fear that the surface oxidation of the ferromagnetic powder becomes non-uniform.

As the oxidizing gas, an inert gas containing oxygen is preferred to use. The oxygen concentration of the oxidizing gas has no particular limitation, but if the gas is too dilute, the reaction is so retarded that it is practically undesirable. Thus, 0.5% by volume or more is preferred. On the other hand, when a solvent is used, the upper limit should be restricted to its explosion range or less for safety. As to the dilution of oxygen in the oxidizing gas, use of an inert gas raises no problem, and nitrogen gas may be advantageously used. Further, the gas quantity is preferred to be adjusted so that 5 to 30 hours may be required for making the quantity of the surface layer oxidized (hereinafter referred to "conversion") 10 to 25%. If the oxidation rate is too high, there is a fear of deterioration of the physical properties due to local heat generation.

As to the body of the reactor 1, a horizontal, cylindrical, rotating type reactor is used, since this horizontal, rotating type reactor can uniformly mix granules of ferroelectric metal powder. In short, the granules within the layer of the granules ascend with rotation of the body of the reactor 1, and after the granules reach the upper end of the granule layer, they drop on the surface of the granule layer. As they drop, they are exposed to the oxidizing gas. Thus, the moving of the granules is uniformly carried out. The granules within the granule layer in the reactor are moved and uniformly mixed as described above, whereby it is possible to form a dense surface-oxidized film on the surface of the ferromagnetic metal powder.

Further, another important point of the apparatus of the present invention consists in that the apparatus lacks any means such as stirrer, etc., which causes the granules of ferromagnetic metal powder to be mechanically pulverized. When the granules of ferroelectric metal powder are pulverized, the powder particles are broken, and further, sintering of the powder particles due to contact thereof with oxidizing gas, agglomeration, etc. occurs, causing deterioration of the physical properties of the powder particles. In the case of the horizontal reactor of the present invention, the factor of causing pulverization is minimal from contact of the granules of ferromagnetic metal powder only with one another; hence the reactor constitutes a structure by which pulverization hardly occurs so that it is possible to restrain the pulverization which deteriorates the physical properties of finally obtained, stabilized ferromagnetic metal powder, to a minimum; thus the resulting powder has a good quality.

Oxygen as an oxidizing gas is removed from the inside of the body of the reactor 1 using nitrogen gas or the like in advance of introducing the granules of ferromagnetic metal powder only into the body. Next, the granules of ferromagnetic metal powder are introduced into the body of the reactor 1 through a feed part or supply valve 2 positioned upward lest the granules should be contacted with air. The quantity of the granules introduced is preferred to be 50% or less, preferably 40% or less of the capacity of the body of the reactor 1, in order to obtain a uniform mixing effect. The granules of ferromagnetic matal powder may be either in a state where they are immersed in an organic solvent or in a state where they are not immersed therein, in the body of the reactor 1. In the case where they are immersed therein, the mixed quantity of the granules of ferromagnetic metal powder and the organic solvent is preferred to be 40% or less of the capacity of the reactor. Examples of usable organic solvents are aromatic hydrocarbons such as benzene, toluene, xylene, etc., fluorine compound solvents such as trifluoroethanol, perfluorooctane, etc., and lower alcohols such as methanol, ethanol, etc.

The granules of ferromagnetic metal powder introduced are uniformly mixed by rotation of the body of the reactor 1 by means of a driving motor 9. By uniformly mixing the granules of ferromagnetic metal powder, it is possible to form a dense and uniform oxidized film on the surface of the granules through their contact with the oxidizing gas.

In order to further improve the uniformity and denseness of the oxidized film, it is preferred to provide a scraping-up plate 13 on the inner wall of the body of the reactor 1 in parallel to the generatrix thereof. As shown in FIGS. 2, 3, 6 and 7 a plurality of scraping-up plates is provided. The scraping-up plate yields a scraping-up effect and the amount of the mixture increases and may be concentrated over a smaller portion of the circumference of the inner cylindrical wall of the reactor body, as shown in FIG. 7, to thereby increase the uniformity of oxidation. Further, since oxidation reaction at the part where the mixture is scraped up by means of the scraping-up plate can also be carried out, it is possible to shorten the reaction time. When a solvent is used, the reaction in the solvent is heterogeneous and retarded and hence not practical; thus it is necessary to fix a scraping-up plate onto the inner wall, and then advance the reaction while the granules are scraped up from the solvent by means of the scraping-up plate and drop into the solvent. Thus, in this case, it is indispensable to provide the scraping-up plate.

The revolution number of the body of the reactor 1, and the width, the number and the angle with respect to the central line of the body of the reactor 1, of the scraping-up plate are optional, but these are preferred to be determined taking into consideration that the oxidation rate and pulverization due to rotation of ferromagnetic metal powder which somewhat occurs due to the fall of the granules from the scraping-up plate, friction of the granules between one another, etc., is to be made as low as possible and also the granules are to be uniformly dispersed within the body of the reactor 1.

An oxidizing gas for oxidizing the granules of ferromagnetic metal powder is blown into the body through a port 3 or 4. It is necessary for the blow-in of the oxidizing gas to uniformly blow the gas toward the granules of ferromagnetic metal powder being uniformly mixed by the rotation of the body of the reactor 1 or the rotation and the scraping-up plate to thereby form a uniform and dense oxidized film. If the oxidizing gas is locally blown toward the granules of ferromagnetic metal powder or oxygen in the oxidizing gas is non-uniform, then the resulting oxidized film becomes non-uniform, however uniformly the granules are mixed. If the speed of the oxidizing gas is low, the oxygen concentration in the oxidizing gas in the axial direction within the body of the reactor 1 varies depending on the oxygen consumption by the reaction and hence is liable to be non-uniform. On the other hand, if the blowing speed is high, local heat generation occurs to deteriorate the physical properties of the granules. Thus, the speed of the oxidizing gas blown toward the granules of ferromagnetic metal powder is preferred to be in the range of 0.01 to 2 m/sec.

As described above, due to the effect of the rotation of the body of the reactor 1 or the rotation of the scraping-up plate 13, the granules of ferromagnetic metal powder are uniformly mixed and the oxidizing gas is blown through the port 3 or 4 to form a uniform oxidized film on the surface of the powder; however, in order to control the reaction temperature optionally and with safety, it is further preferred to provide a jacket 16 on the body of the reactor 1 as shown in FIGS. 4, 5, 6 and 7. As to the heat generation due to the oxidation, when iron is oxidized to magnetite ($Fe_3O_4$), the quantity of heat generated is 1,600 Kcal per Kg of iron. Due to the reaction heat, the granules of ferromagnetic metal powder generate heat and due to overheating at that time, there is a fear that the reaction abruptly proceeds resitting in deterioration the physical properties of the granules. Further, even in the case of slight overheating, the oxidized film on the surface of the ferromagnetic metal powder is liable to becomes non-uniform. Thus, in order to prevent such overheating to thereby form a dense oxidized film, it is preferred to control the reaction temperature. On the other hand, when a solvent is used, if the temperature is low, the reaction does not proceed so that it is necessary to raise the temperature. Thus, it is preferred to provide a jacket 16 on the body of the reactor 1.

The efficiency of contact of the ferromagnetic metal powder with the oxidizing gas varies depending on the structure and the rotation number of the body of the reactor 1, the quantity of the raw material fed, the size of the scraping-up plate 13, the quantity and concentration of the oxidizing gas blown through the port 3 or 4 and use or nonuse of the solvent, and hence an adequate inner temperature of the reactor (the temperature referring to the temperature of the granules in the reactor; and this applying to the subsequent); thus it is possible to afford a desired inner temperature by adjusting the jacket temperature. The inner temperature of the reactor is preferred to be generally in the range of 0° to 90° C. If the temperature is lower than 0° C., a problem is raised in that the cooling cost is high and the reaction time is prolonged; hence such low temperature is commercially unadvantageous. On the other hand, if the temperature is higher than 90° C., the oxidization reaction rapidly proceeds so that the oxidized film cannot be dense to thereby deteriorate the physical properties of the ferromagnetic metal powder.

When an organic solvent is used, the organic solvent vaporizes into the oxidizing gas and is withdrawn from the body of the reactor to the outside of the system, accompanying the gas. At that time, the solvent may be either withdrawn as it is, or condensed by a condenser, recovered and returned to the body of the reactor 1. Further, it is also possible to adequately withdraw the solvent midway through a valve 2 positioned below.

The reaction can be adjusted so as to give a conversion of 10 to 25% and a reaction time of 5 to 30 hours, through uniform mixing of the granules of ferromagnetic metal powder by the rotation of the body of the reactor 1 and if desired, rotation and the scraping-up plate 13, uniform oxidation by blowing the oxidizing gas therein through the port 3 or 4, and if desired, control of the inner temperature by adusting the temperature of the jacket 16; thus it is possible to form a uniform and dense oxidized film on the ferromagnetic metal powder.

The resulting granules of ferromagnetic metal powder having a uniform and dense oxidized film formed thereon are withdrawn through the valve 2, and as to the withdrawing manner, the body 1 is tilted and rotated and the granules are collected to the side of the valve 2 and withdrawn through the valve 2 positioned below.

As described above, according to the present invention, the granules of ferromagnetic metal powder are not only uniformly mixed due to the effect of the rotation of the body of the reactor or the rotation of the scraping-up plate, but also almost no pulverization having a bad influence upon the physical properties of the ferromagnetic metal powder occurs; hence a uniform and dense oxidized film is formed on the surface of the powder so that it is possible to obtain granules of ferro magnetic metal powder having a good quality and a stabilized surface.

The effectiveness of the present invention will be described im more detail by way of reference examples and comparative examples.

REFERENCE EXAMPLE 1

Figure 6:
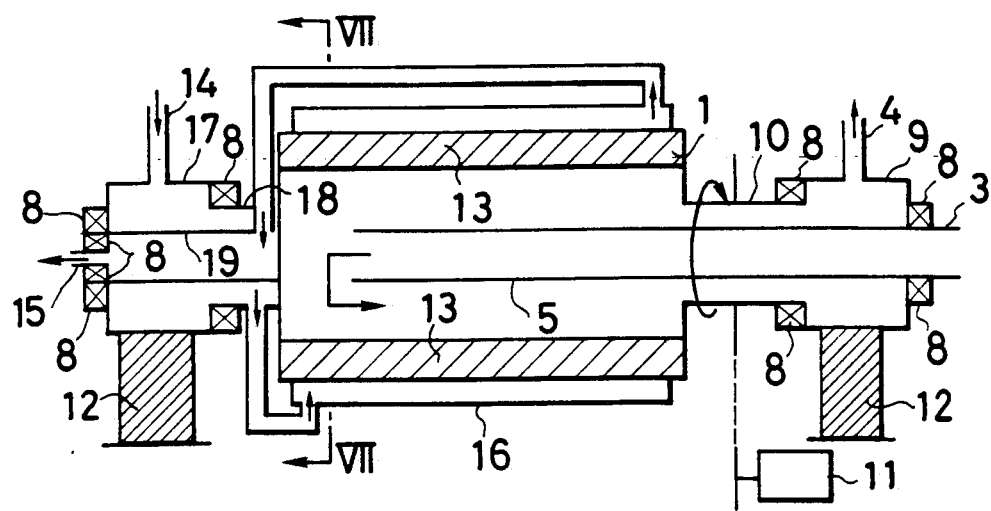
Figure 7:
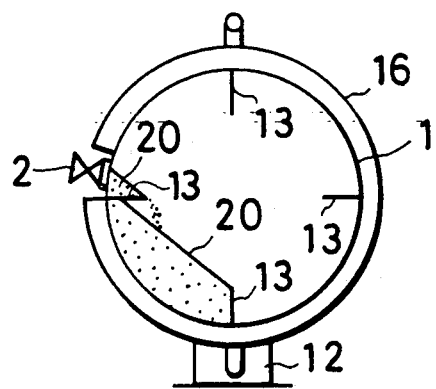
FIG. 7 shows a cross-sectional schematic view along the line VII—VII of FIG. 6.

Into the body of a reactor 1 in a stabilization apparatus having its inside purged with nitrogen gas in advance, as shown in FIGS. 6 and 7, which body has a length of 1,200 mm and a diameter of 400 mm and is provided with 4 scrapin-up plates 13 each having a width of 75 mm, were fed granules of ferro magnetic metal powder of 1 to 2 mm in diameter and 2 to 5 mm long (10 Kg on the basis of dry weight) through a valve 2, which granules were immersed in toluene (35 Kg) and which ferromagnetic metal powder contained 10% by weight of Ni, 1.5% by weight of Al, 2.5% by weight of Si, each weight based on the weight of iron and the remainder being iron. A motor 11 was driven and the body of the reactor 1 was rotated at 2 rpm. Warm water was passed through a jacket 16 to raise the temperature of the jacket up to 40° C. When 40° C. was attained, nitrogen gas containing 5% by volume of oxygen was blown into the body through a gas inlet 3 at a rate of 30 $Nm^3/Hr$. In such a state, reaction was carried out for 15 hours. During the period, toluene distilled out accompanying the oxidizing gas was condensed by a condenser fixed onto the outer part and returned to the inside of the apparatus. After the reaction for 15 hours, while the reaction conditions were maintained, the toluene distilled out accompanying the oxidizing gas was withdrawn to the outside of the reaction system and drying of the granules of ferromagnetic metal powder was started. Ten hours were required until toluene in the apparatus was entirely freed. At this point, the reaction was stopped and the resulting treated granules of ferromagnetic metal powder were withdrawn through a valve 2 positioned downward.

The physical properties and conversions of the ferromagnetic metal powder forming the granules prior to the treatment and after treatment are shown in Table 1. In additon, the conversion was sought regarding the iron as having been converted into magnetite and also regarding this magnetite as having no magnetic properties (this applies to the subsequent conversion).

REFERENCE EXAMPLE 2

Into the same apparatus as used in Reference example 1 was fed the same granules of ferromagnetic metal powder as used in Reference example 1 in the same quantity and immersed in toluene (35 Kg). In the same manner as in Reference example 1, the jacket temperature was made 40° C., nitrogen gas containing 5% by volume of oxygen was blown into the body at a rate of 30 $Nm^3/Hr$ and the body of the reactor was rotated at 2rpm. Under such conditions, reaction was carried out for 15 hours. During the period, toluene distilled out accompanying the oxidizing gas was recovered and returned to the apparatus. After the reaction for 15 hours, the rotation of the body of the reactor was stopped, and toluene inside the apparatus was withdrawn through a valve 2 positioned downward and provided with a wire gauze. However, toluene adhering to the inner wall of the body of the reactor and the granules of ferromagnetic metal powder remained inside the body of the reactor. Thereafter, the rotation of the body of the reactor was again carried out at 2 rpm. The same reaction conditions such as the jacket temperature, the quantity of the gas blown, etc. as above were employed. The distilled-out toluene was withdrawn to the outside of the system and the granules of ferromagnetic metal powder inside the apparatus were dried over 8 hours. After the druing, the granules of ferromagnetic metal powder were withdrawn through the valve 2.

The physical properties and conversions of the ferromagnetic metal powder forming the granules prior to the treatment and after treatment are shown in Table 1.

REFERENCE EXAMPLE 3

The same apparatus and granules of ferromagnetic metal powder as in Reference example 1 were used and reaction was carried out under the same conditions as in Reference example 1 except that distilled-out toluene was not returned and all withdrawn to the outside of the system and when the granules of ferromagnetic metal powder were dried (10 hour since the start of the reaction), the granules were withdrawn.

The physical properties and conversions of the ferromagnetic metal powder forming the granules prior to the treatment and after treatment are shown in Table 1.

REFERENCE EXAMPLE 4

The same apparatus and granules of ferromagnetic metal powder as in Reference example 1 were used, and reaction was carried out under the same conditions as in Reference example 1 except that the jacket temperature was made 60° C. After reaction for 15 hours, the granules of ferromagentic metal powder were dried over 7 hours in the same manner as in Reference example 1 except that the jacket temperature was made 60° C., and were withdrawn.

The physical properties and conversions of the ferromagnetic metal powder forming the granules prior to the treatment and after treatment are shown in Table 1.

REFERENCE EXAMPLE 5

Using the same apparatus and granules of ferromagnetic metal powder and under the same conditions as in Reference example 4, reaction was carried out for 15 hours. After 15 hours, toluene was withdrawn in the same manner as in Reference example 2 and drying was then carried out under the initial reaction conditions. After the granules of ferromagnetic metal powder were dried for 5 hours, they were withdrawn.

The physical properties and conversions of the ferromagnetic metal powder forming the granules prior to the treatment and after treatment are shown in Table 1.

REFERENCE EXAMPLE 6

Reaction was carried out using the same apparatus and under the same conditions as in Reference example 4 except that distilled-out toluene was not returned and was withdrawn to the outside of the system. After the granules of ferromagnetic metal powder were dried for 7 hours, they were withdrawn through the valve 2.

The physical properties and conversions of the ferromagnetic metal powder prior to the treatment and after treatment are shown in Table 1.

REFERENCE EXAMPLE 7

Into the same apparatus as in Reference example 1 were fed the same granules of ferromagnetic metal powder in the same quantity together with toluene in the same quantity each as in Reference example 1. Next, toluene was withdrawn through the valve 2 positioned downward and having a wire gauze attached thereto, in advance of the reaction. However, toluene adhered to the inner wall of the body of the reactor and granules of ferromagnetic metal powder remained inside the body of the reactor. The body of the reactor was rotated at 2 rpm. $N_2$ gas containing 1% by volume of oxygen was blown into the body through a gas inlet 3. Reaction was continued until the granules of ferromagnetic metal powder were dried. Seventeen hours were required. The granules were then withdrawn.

The physical properties and conversions of the ferromagnetic metal powder prior to the treatment and after treatment are shown in Table 1.

REFERENCE EXAMPLE 8

Reaction was carried out using the same apparatus and granules and under the same conditions each as in Reference example 7 except that the jacket temperature was made 20° C. However, the reaction was carried out until the granules were dried. Fifteen hours were required.

The physical properties and conversions of the ferromagnetic metal powder forming the granules prior to the treatment and after treatment are shown in Table 1.

REFERENCE EXAMPLE 9

The same granules of ferromagnetic metal powder (10 Kg) as in Reference example 1 was fed as they were, without being immersed in toluene, into the same apparatus as in Reference example 1, and purged with nitrogen gas, through the valve 2. The body of the reactor was rotated by means of a driving motor 11 at 2 rpm. Water was passed through the jacket 16 to make the jacket temperature 20° C. Nitrogen gas containing 0.5% of oxygen was blown into the body through the inlet 3 at a rate of 30 $Nm^3$/Hr and reaction was carried out for 20 hours. The body of the reactor was then tilted and the granules of the surface-treated ferromagnetic metal powder were withdrawn through the valve 2.

The physical properties and conversions of the ferromagnetic metal powder prior to the treatment and after treatment are shown in Table 1.

All of the treated granules of ferromagnetic metal powder were unchanged in state from those prior to the treatment and free-flowing and there was almost no pulverization.

COMPARATIVE EXAMPLE 1 the same granules of ferromagnetic metal powder (10 kg) as in Reference example 1 were ground by means of a mill in toluene into particles of about 0.05 mm in diameter, and the particles were fed into a vertical, cylindrical reactor of 400 mm in diameter and 1,000 mm high equipped with a jacket and having a stirrer. The height of the particle layer was 160 mm. Toluene was additionally added up to a height of 800 mm in the reactor. While the stirrer was rotated at 180 rpm and the particles were dispersed, the jacket temperature was raised up to 60° C. and $N_2$ gas containing 5% by volume of oxygen was blown into the reactor at a rate of 30 $Nm^3$/Hr to carry out oxidation. At that time, toluene accompanying the gas was condensed by a condenser and returned to the reactor. After the reaction for 20 hours, the gas feed was stopped and the jacket temperature was lowered down to 20° C. The stirrer was also stopped. Particles after the surface oxidation-treatment were filtered off and toluene was vaporized at room temperature in $N_2$ current to dry the particles, followed by measuring the physical properties and conversion of the particles. The results are shown in Table 1. As compared with Reference example 1, it is evident that notable deterioration in the physical properties occurred.

COMPARTIVE EXAMPLE 2

The same granules of ferromagnetic metal powder (10 Kg) as in Reference example 1 were fed as they were, without being immersed in toluene, into a fixed bed reactor of 400 mm in diameter and 800 mm high equipped with a jacket and designed so as to blow an oxidizing gas from its lower part thereinto. The reactor was purged with nitrogen gas in advance. The height of the layer of the granules was 20 cm. The jacket temperature was made 20° C. and nitrogen gas containing 0.5% by volume of oxygen was blown into the reactor from its lower part at a rate of 10 $Nm^3$/Hr to carry out reaction for 30 hours. After the reaction, the resulting granules of the surface-treated ferromagnetic metal powder were withdrawn from the reactor into the air. As a result, the granules immediately became red hot.

TABLE 1

| | Coersive force [Oe] | Relative squareness [-] | Saturation magnetization [emu/g] | Conversion*(1) [%] |
|---|---|---|---|---|
| Physical properties before treatment | 1510 | 0.51 | 165 | 0 |
| Ref. ex. 1 | 1520 | 0.51 | 125 | 19 |
| Ref. ex. 2 | 1520 | 0.51 | 128 | 17 |
| Ref. ex. 3 | 1520 | 0.51 | 135 | 14 |
| Ref. ex. 4 | 1515 | 0.51 | 120 | 21 |
| Ref. ex. 5 | 1515 | 0.51 | 123 | 20 |
| Ref. ex. 6 | 1515 | 0.51 | 132 | 15 |
| Ref. ex. 7 | 1520 | 0.51 | 143 | 10 |
| Ref. ex. 8 | 1520 | 0.51 | 132 | 15 |
| Ref. ex. 9 | 1500 | 0.51 | 120 | 21 |
| Comp. ex. 1 | 1350 | 0.46 | 125 | 19 |
| Comp. ex. 2 | Measurement was impossible due to ignition. | | | |

*(1)The conversion was sought regarding the iron on the surface of the ferromagnetic metal powder as being oxidized into magnetite ($Fe_3O_4$) and also regarding the magnetite as having no magnetic properties.

What we claim is:

1. An apparatus for stabilizing treatment of ferromagnetic metal powder, which apparatus comprises:
    a horizontal, cylindrical, rotating type reactor body provided with end walls substantially perpendicular to a cylindrical side wall which forms an inner wall of said reactor body;
    a jacket for a heat transfer medium;
    a port including a valve for feeding said ferromagnetic metal powder into said reactor body;
    a port for withdrawing said ferromagnetic metal powder from said reactor body, which port may be used in common with said feeding port;
    a passageway for blowing an oxidizing gas into said reactor body comprising an oxidizing gas inlet in communication with a pipe arranged within said reactor body coaxially with respect to the axis of rotation of said reactor body, said passageway arranged to be in substantial non-contacting relationship with ferromagnetic metal powder and said pipe, having an outlet end, extends longitudinally through said reactor body, said outlet end positioned proximate the side wall remote from said oxidizing gas inlet;

a passageway for withdrawing said oxidizing gas from said reactor body comprising an oxidizing gas outlet in communication with a duct connected to said reactor body and arranged coaxially with respect to the axis of rotation of said reactor body, said passageway arranged to be in substantial non-contacting relationship with ferromagnetic metal powder; and a plurality of scraping up plates for said ferromagnetic metal powder arranged on said inner wall of said reactor body parallel to the axis of rotation of said reactor body and extending longitudinally from one end of the reactor body to the other end thereof.

2. An apparatus according to calim 1 wherein said plurality of scraping-up plates comprises two scraping-up plates.

3. An apparatus for stabilizing treatment of ferromagnetic metal powder, which apparatus comprises:

a horizontal, cylindrical, rotating type reactor body provided with end walls substantially perpendicular to a cylindrical side wall which forms an inner wall of said reactor body;

a jacket for a heat transfer medium;

a port including a valve for feeding said ferromagnetic metal powder into said reactor body;

a port for withdrawing said ferromagnetic metal powder from said reactor body, which port may be used in common with said feeding port;

a passageway for blowing an oxidizing gas into said reactor body comprising an oxidizing gas inlet in communication with a duct connected to said reactor body and arranged coaxially with respect to the axis of rotation of said reactor body, said passageway arranged to be in substantial non-contacting relationship with ferromagnetic metal powder;

a passageway for withdrawing said oxidizing gas from said reactor body comprising an oxidizing gas outlet in communication with a pipe arranged within said reactor body coaxially with respect to the axis of rotation of said reactor body, said passageway arranged to be in substantial non-contacting relationship with ferromagnetic metal powder and said pipe, having an inlet end, extends longitudinally through said reactor body, said inlet end positioned proximate the side wall remote from said oxidizing gas outlet; and a plurality of scraping up plates for said feromagnetic metal powder arranged on said inner wall of said reactor body parallel to the axis of rotation of said reactor body and extending longitudinally from one end of the reactor body to the other end thereof.

4. An apparatus according to claim 3 wherein said plurality of scraping-up plates comprises two scraping-up plates.

* * * * *